Oct. 4, 1932.   D. W. HART   1,881,274
LOCATING DEVICE
Filed Dec. 4, 1930
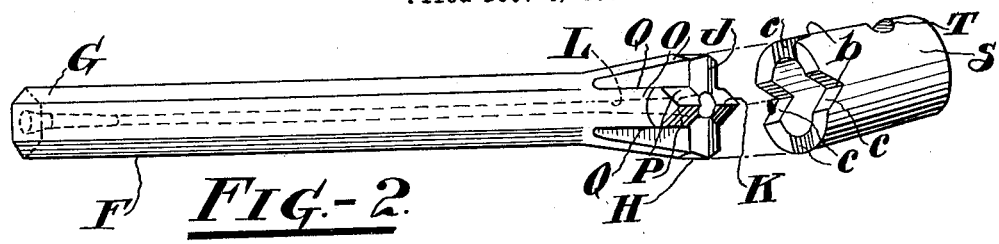
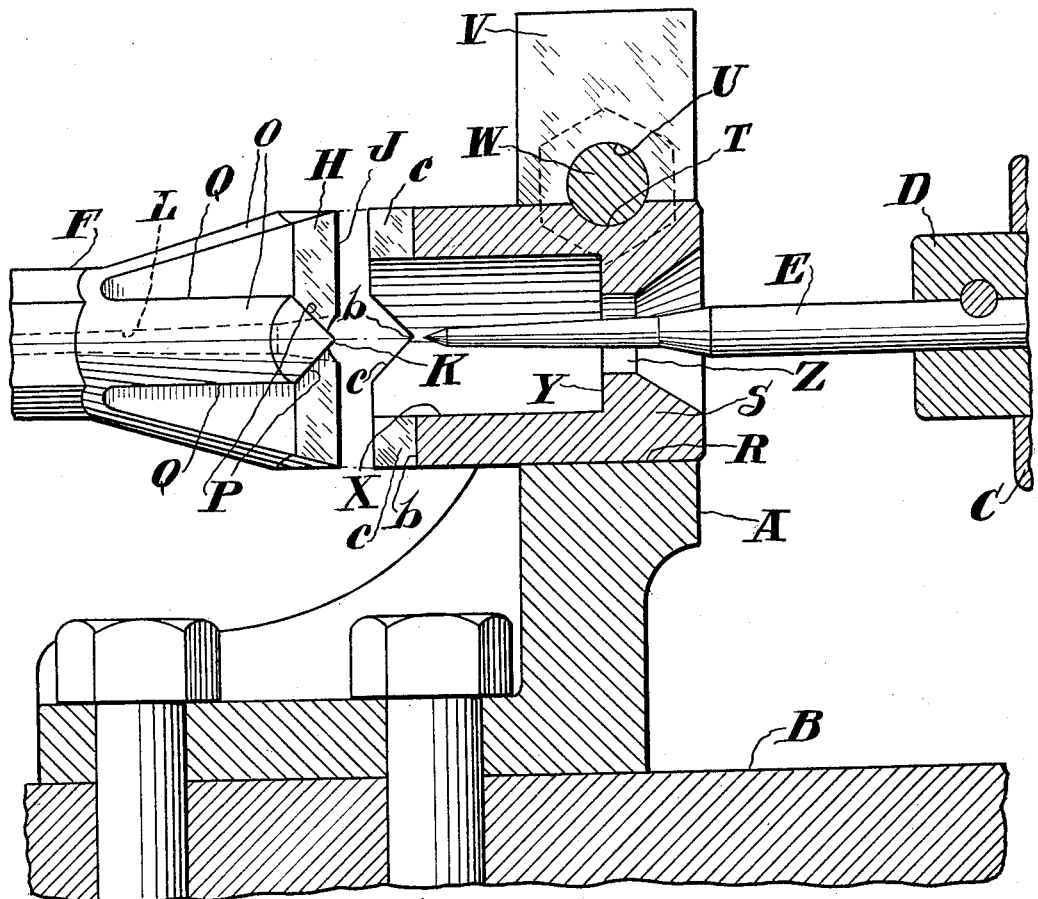
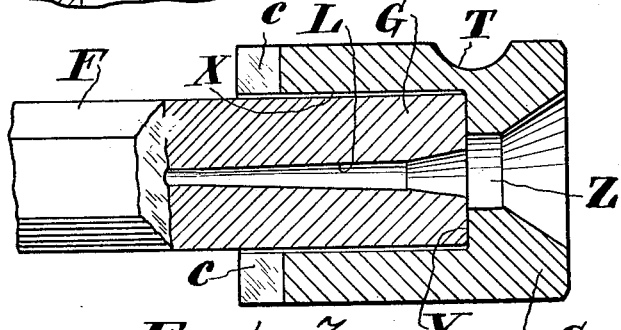
INVENTOR.
Dudley W. Hart.
BY
HIS ATTORNEY.

Patented Oct. 4, 1932

1,881,274

UNITED STATES PATENT OFFICE

DUDLEY W. HART, OF DENVER, COLORADO, ASSIGNOR TO INGERSOLL-RAND COMPANY, OF JERSEY CITY, NEW JERSEY, A CORPORATION OF NEW JERSEY

LOCATING DEVICE

Application filed December 4, 1930. Serial No. 499,961.

This invention relates to locating devices, but more particularly to a device for holding the ends of a drill steel in axial alignment with a pin punch for opening the ends of the passage in the drill steel whenever the passage becomes deformed during a prior forging operation.

One object of the invention is to assure proper alignment of the drill steel with a punch pin.

Another object is to enable the same locating device to be used for guiding either the bit or the shank ends of the drill steel.

Other objects will be in part obvious and in part pointed out hereinafter.

In the drawing accompanying this specification and in which similar reference characters refer to similar parts, Figure 1 is a sectional elevation of a locating device constructed in accordance with the practice of the invention, Figure 2 is a perspective view of the guide member and a drill steel for the ends of which the guide member is intended to form seating surfaces, and Figure 3 is a longitudinal sectional elevation of the guide member and a portion of a drill steel showing the manner in which the guide member serves to centralize the shank end of a drill steel.

Referring more particularly to the drawing, A designates a support seated upon a base B and which base may form a portion of a drill sharpener (not shown) to support a shank and bit punch, only an end of a front head C of which is shown. In the front head C may be disposed the usual anvil block D to support a punch pin E intended for opening the bores in working implements, such as the drill steel F.

The drill steel F has the usual shank G to extend into a rock drill whereby the drill steel may be actuated, and at the opposite end of the drill steel is the cutting bit H which, in this instance, is of the cruciform type having mutually perpendicular cutting edges J and K. In the working implement is a passage L through which cleansing fluid may flow from a source for removing the detritus from the bottom of the drill hole.

The cutting edges J are formed on the ends of the flared wings O and leading from the cutting edges J and K are inclined surfaces P which merge into the sides Q of the wings O.

In accordance with the present invention, means are provided to assure coaxial alignment of the shank and bit ends of the working implement F with the punch pin E so that the punch pin may readily enter the passage L in the working implement for the purpose of opening the ends of the passage whenever they become deformed during a prior forging operation. To this end the support A is provided with an aperture R to receive a guide member S having a transverse notch T in its periphery which, in the assembled position of the guide member S, registers with an aperture U in the support A. The upper end of the support A may be slotted to form a pair of wings V and in the aperture U and the notch T is a bolt W for drawing the wings V tightly against the guide member S and for holding the guide member against rotation with respect to the support A.

Within the guide member S is a bore X to receive the shank G of the working implement and to maintain the said shank in alignment with the punch pin E. In the bottom of the bore X is a shoulder Y against which the end of the shank may seat and the bore X is therefore somewhat restricted as at Z to permit the punch pin E to pass therethrough into the working implement.

To the end that the bit end of the working implement F may be similarly located with respect to the punch pin E, the guide member S is provided with a plurality of radial notches $b$ in the end thereof to receive the cutting edges J and K. The notches $b$ are therefore, like the cutting edges J and K, mutually perpendicular and the sides $c$ of the notches are inclined to correspond with the degree of inclination of the surfaces P for which they serve as seating surfaces. Owing to this arrangement of the notches $b$ the bit end of the working implement may be held properly aligned with the punch pin E which during its operation may be advanced in the usual manner in the direction of the working implement.

In practice the present invention has been found to be unusually well adapted for the purpose for which it is intended. It serves as a convenient means for guiding both the shank G and the bit end H of the working implement and therefore does not require the frequent change of individual guiding members for the several ends of the working implement.

I claim:

1. A locating device for working implements comprising a member having a bore therein adapted to receive and centralize the shank of a working implement, said member having a face surrounding the opening of said bore adapted to receive and centralize the working end of a working implement, and means in said member to admit a tool to operate on said working implement.

2. A locating device adapted for use in a shank and bit punch comprising a block having a recess to receive and centralize a drill steel shank, the face of said block surrounding said recess having depressions therein to receive and centralize a drill steel bit, and the back of said block having an aperture adapted to admit a punching tool into the recess.

3. A locating device for working implements comprising a member having a bore therein to receive and centralize the shank of a working implement, there being means in the bore to limit the penetration of the shank therein, a face on said member at right angles with said bore adapted to receive and centralize the working face of a working implement, and a continuation of said bore to permit introduction of a tool from the rear thereof to work upon said working implement.

In testimony whereof I have signed this specification.

DUDLEY W. HART.